(12) United States Patent
Benarroch Guenun et al.

(10) Patent No.: US 10,333,710 B2
(45) Date of Patent: Jun. 25, 2019

(54) METHOD AND SYSTEM FOR DETERMINING DESIRED SIZE OF PRIVATE RANDOMNESS USING TSALLIS ENTROPY

(71) Applicant: QED-it Systems Ltd., Tel Aviv (IL)

(72) Inventors: Daniel Messod Benarroch Guenun, Rehovot (IL); Yakov Gurkan, Netanya (IL); Aviv Zohar, Jerusalem (IL)

(73) Assignee: QED-IT SYSTEMS LTD., Tel Aviv (IL)

( * ) Notice: Subject to any disclaimer, the term of this patent is extended or adjusted under 35 U.S.C. 154(b) by 0 days.

(21) Appl. No.: 15/727,575

(22) Filed: Oct. 7, 2017

(65) Prior Publication Data

US 2018/0034634 A1    Feb. 1, 2018

Related U.S. Application Data

(60) Provisional application No. 62/557,193, filed on Sep. 12, 2017.

(51) Int. Cl.
| | |
|---|---|
| *H04L 9/00* | (2006.01) |
| *H04L 9/12* | (2006.01) |
| *H04L 9/30* | (2006.01) |
| *H04L 9/06* | (2006.01) |
| *H04L 9/08* | (2006.01) |
| *H04L 9/32* | (2006.01) |

(52) U.S. Cl.
CPC .............. *H04L 9/12* (2013.01); *H04L 9/0662* (2013.01); *H04L 9/0869* (2013.01); *H04L 9/3066* (2013.01); *H04L 9/3073* (2013.01); *H04L 9/3218* (2013.01)

(58) Field of Classification Search
CPC ....... H04L 9/12; H04L 9/3073; H04L 9/3066; H04L 9/0662; H04L 9/3218; H04L 9/0869
USPC ............................................. 380/44, 262, 46
See application file for complete search history.

(56) References Cited

U.S. PATENT DOCUMENTS

| | | | | |
|---|---|---|---|---|
| 2014/0298038 A1* | 10/2014 | Gauravaram | ......... | H04L 9/0643 713/189 |
| 2016/0087792 A1* | 3/2016 | Smith | .................... | H04L 9/0836 380/278 |
| 2016/0225340 A1* | 8/2016 | Kim | ....................... | G09G 5/363 |
| 2017/0005792 A1* | 1/2017 | Rietman | ............... | H04L 9/0838 |
| 2017/0013451 A1* | 1/2017 | Miao | ....................... | H04W 8/18 |
| 2017/0063827 A1* | 3/2017 | Ricardo | .................. | H04L 63/08 |

(Continued)

*Primary Examiner* — Aravind K Moorthy
(74) *Attorney, Agent, or Firm* — Sterne, Kessler, Goldstein & Fox P.L.L.C.

(57) ABSTRACT

A method and a system for generating private randomness and/or public randomness are provided. A measurement of a public randomness and/or a measurement of a plaintext may be obtained, and a desired size of a private randomness may be determined based on the measurements. The measurements may be based on one or more Tsallis entropy values of the public randomness and/or the plaintext. Private randomness may be generated, the private randomness may be encrypted, the private randomness may be deleted so that the private randomness is unrecoverable, and the encrypted private randomness may be published. Encrypted private randomness and public randomness may be obtained, and a new public randomness may be generated based on the public randomness and the encrypted private randomness.

18 Claims, 5 Drawing Sheets

(56) References Cited

U.S. PATENT DOCUMENTS

| | | | |
|---|---|---|---|
| 2017/0147673 A1* | 5/2017 | Burdick | G06F 16/2465 |
| 2017/0264430 A1* | 9/2017 | Robertson | H04L 9/085 |
| 2017/0272244 A1* | 9/2017 | Garcia Morchon | H04L 9/0838 |
| 2017/0357496 A1* | 12/2017 | Smith | G06F 8/65 |
| 2018/0024813 A1* | 1/2018 | Naito | G06F 7/58 |
| | | | 708/250 |
| 2018/0034630 A1* | 2/2018 | Rietman | H04L 9/3093 |
| 2018/0034636 A1* | 2/2018 | Benarroch Guenun | |
| | | | H04L 9/3066 |
| 2018/0046436 A1* | 2/2018 | Lu | G06F 7/588 |
| 2018/0048463 A1* | 2/2018 | Benarroch Guenun | |
| | | | H04L 9/3066 |
| 2018/0123788 A1* | 5/2018 | Moon | G06F 7/58 |
| 2018/0276069 A1* | 9/2018 | Takayama | G06F 11/1068 |
| 2018/0300108 A1* | 10/2018 | Goldman | G06F 7/588 |

* cited by examiner

METHOD AND SYSTEM FOR DETERMINING DESIRED SIZE OF PRIVATE RANDOMNESS USING TSALLIS ENTROPY

CROSS REFERENCES TO RELATED APPLICATIONS

This application claims the benefit of priority of U.S. Provisional Patent Application No. 62/557,193, filed on Sep. 12, 2017, which is incorporated herein by reference in its entirety.

BACKGROUND

Technological Field

The disclosed embodiments generally relate to cryptographic methods and systems. More particularly, the disclosed embodiments relate to methods and systems for determining a desired size of private randomness using Tsallis entropy.

Background Information

Cryptography is becoming increasingly prevalent. The usage of encrypted communication, data encryption, digital signatures, data authentication, decentralized public databases and decentralized public ledgers is increasing.

Tsallis entropy is a generalization of the standard Boltzmann Gibbs entropy. Tsallis entropy is used in a number of computer science applications.

SUMMARY

In some embodiments, methods and systems for generating public randomness are provided.

In some embodiments, private randomness may be generated; the private randomness may be encrypted; the private randomness may be deleted so that the private randomness is unrecoverable; and the encrypted private randomness may be published. In some examples, the published encrypted private randomness may be configured to enable a calculation of a public randomness based on the private randomness after the deletion of the private randomness.

In some embodiments, public randomness and encrypted private randomness may be obtained; and a new public randomness may be generated based on the public randomness and the encrypted private randomness. In some examples, the encrypted private randomness may be based on a private randomness, and the private randomness may be deleted so that the private randomness is unrecoverable before the generation of the new public randomness. In some examples, the new public randomness may be published.

In some embodiments, a measurement of a public randomness and/or a measurement of a plaintext may be obtained; based on the measurement of the public randomness and/or the measurement of the plaintext, a desired size of private randomness may be determined; and private randomness may be generated so that the size of the private randomness is at least the determined desired size. In some examples, the measurement of the public randomness may be based on the length of the public randomness, number of contributors to the public randomness, a measurement of a contribution of a contributor to the public randomness, entropy of the public randomness, Tsallis entropy of the public randomness, and so forth. In some examples, the measurement of the plaintext may be based on the length of the plaintext, entropy of the plaintext, Tsallis entropy of the plaintext, and so forth.

DESCRIPTION

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

As used herein, the terms "encrypt", "encrypting" or variants thereof does not necessarily convey that the resulting encrypted data can be decrypted, but that deducing the original data from the resulting encrypted data is computationally hard under common hardness assumptions or common cryptographic hardness assumptions.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

Figure 1:
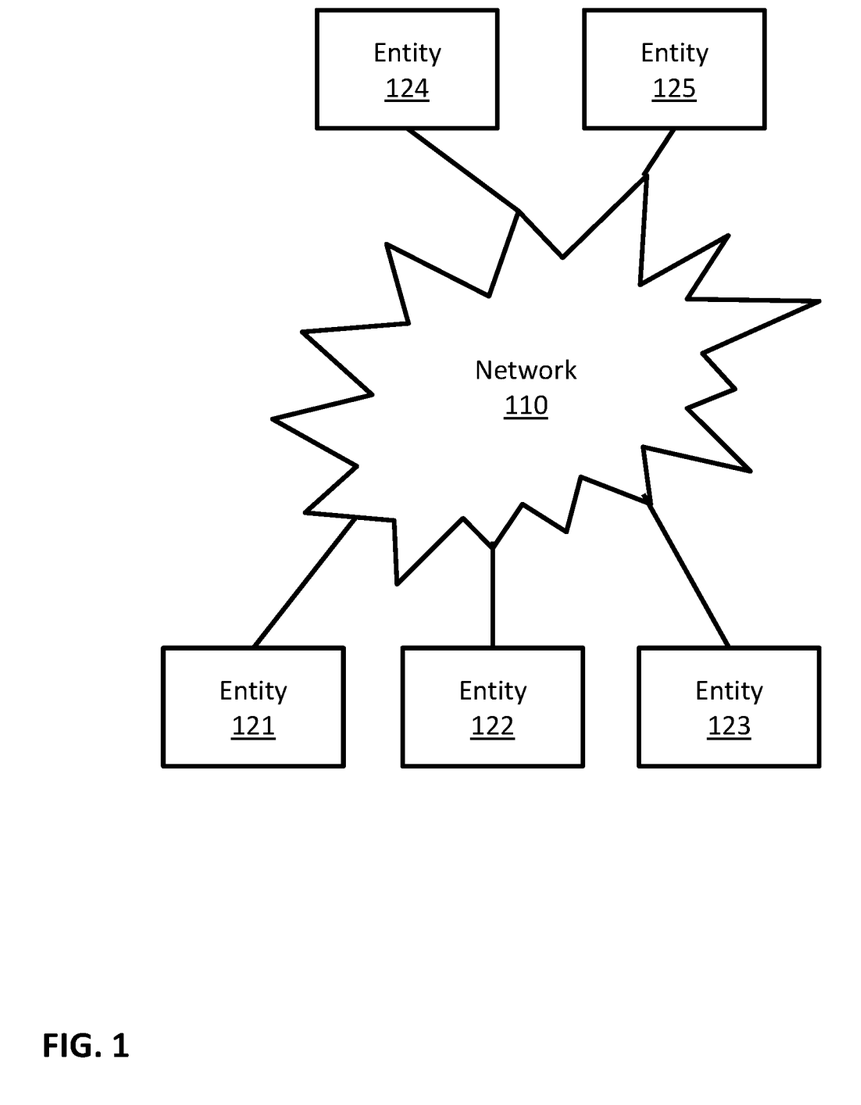
FIG. 1 is a block diagram illustrating a possible implementation of a communication system.

FIG. 1 is a block diagram illustrating a possible implementation of a communicating system. Two or more entities may communicate with each other. In this example, five entities 121, 122, 123, 124 and 125 may communicate with each other over network 110. In some embodiments, any entity may communicate with all other entities, while in other embodiments the communication among entities is restricted to specific pairs of entities. In some embodiments, the entities may communicate directly with each other, and/or through a third party system, such as a cloud platform and/or a server connected to network 110. In some embodiments, network 110 may include any combination of the Internet, phone networks, cellular networks, satellite communication networks, private communication networks, virtual private networks (VPN), a group of point-to-point communication lines that connect pairs of entities, email servers, instant messaging servers, file servers, package delivery service delivering digital and/or non-digital media from one entity to the other, and so forth. In some embodiments, an entity, such as entities 121, 122, 123, 124 and 125, may include a computerized system 200, for example as described in FIG. 2. In some embodiments, an entity, such as entities 121, 122, 123, 124 and 125, may include desktop computers, laptop computers, tablets, mobile devices, server computers, applications, cloud computing platforms, virtual machines, and so forth.

Figure 2:
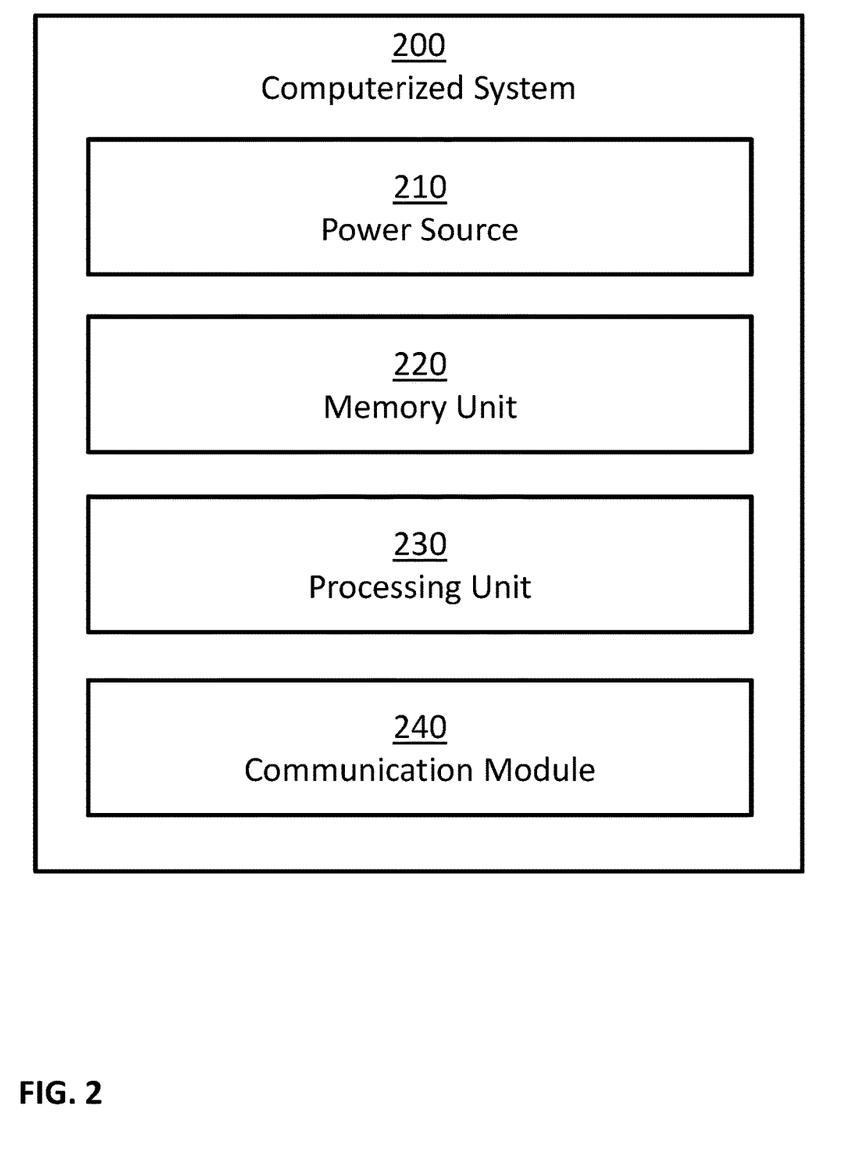
FIG. 2 is a block diagram illustrating a possible implementation of a computerized system.

FIG. 2 is a block diagram illustrating a possible implementation of a computerized system 200. In this example, computerized system 200 comprises: one or more power sources 210; one or more memory units 220; one or more processing units 230; and one or more communication modules 240. In some implementations, additional components may be included in computerized system 200, while some components listed above may be excluded. In some embodiments, power sources 210 and/or communication modules 240 may be excluded from the implementation of computerized system 200. In some embodiments, computerized system 200 may further comprise one or more of the followings: one or more audio output units; one or more visual outputting units; one or more tactile outputting units; one or more sensors; one or more clocks; one or more user input devices; one or more keyboards; one or more mouses; one or more touch pads; one or more touch screens; one or more antennas; one or more output devices; one or more audio speakers; one or more display screens; one or more augmented reality display systems; one or more LED indicators; and so forth.

In some embodiments, power sources 210 may be configured to power computerized system 200. Some possible implementation examples power sources 210 may comprise: one or more electric batteries; one or more capacitors; one or more connections to external power sources; one or more power convertors; one or more electric power generators; any combination of the above; and so forth.

In some embodiments, processing units 230 may be configured to execute software programs, for example software programs stored in memory units 220, software programs received through communication modules 240, and so forth. Some possible implementation examples of processing units 230 may comprise: one or more single core processors; one or more multicore processors; one or more controllers; one or more application processors; one or more system on a chip processors; one or more central processing units; one or more graphical processing units; one or more neural processing units; any combination of the above; and so forth. In some examples, the executed software programs may store information in memory units 220. In some cases, the executed software programs may retrieve information from memory units 220.

In some embodiments, processing units 230 may support a protected execution of software, ensuring that a specific version of software is executed and/or that memory used by the software is not modified by external sources. For example, processing units 230 may allow software to create and/or use private regions of memory, protect selected code and/or data from disclosure and/or modification, detect and/or prevent tampering of code and/or data, securely encrypt selected code and/or data, and so forth.

In some embodiments, communication modules 240 may be configured to receive and/or transmit information. Some possible implementation examples of communication modules 240 may comprise: wired communication devices; wireless communication devices; optical communication devices; electrical communication devices; radio communication devices; sonic and/or ultrasonic communication devices; electromagnetic induction communication devices; infrared communication devices; transmitters; receivers; transmitting and receiving devices; modems; network interfaces; wireless USB communication devices, wireless LAN communication devices; Wi-Fi communication devices; LAN communication devices; USB communication devices; firewire communication devices; bluetooth communication devices; cellular communication devices, such as GSM, CDMA, GPRS, W-CDMA, EDGE, CDMA2000, etc.; satellite communication devices; and so forth.

In some implementations, control signals and/or synchronization signals may be transmitted and/or received through communication modules 240. In some implementations, information received though communication modules 240 may be stored in memory units 220. In some implementations, information retrieved from memory units 220 may be transmitted using communication modules 240. In some implementations, input and/or user input may be transmitted and/or received using communication modules 240. In some implementations, output information may be transmitted and/or received through communication modules 240.

Figure 3:
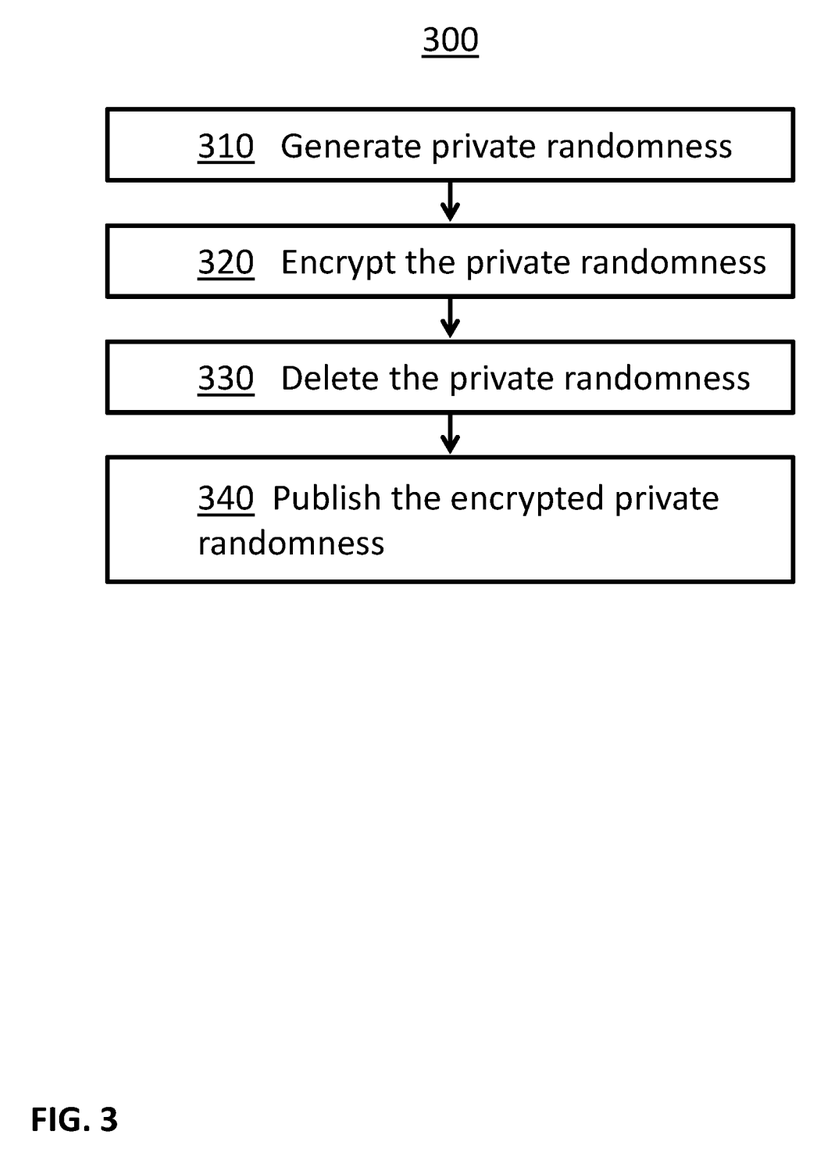
FIG. 3 illustrates an example of a process for generating randomness.

FIG. 3 illustrates an example of process 300 for generating randomness. In some examples, process 300, as well as all individual steps therein, may be performed by various aspects of: processing unit 230, computerized system 200, and so forth. For example, process 300 may be performed by processing units 230, executing software instructions stored within memory units 220. Process 300 may comprise: generating private randomness (Step 310), encrypting the private randomness (Step 320), deleting the private randomness (Step 330), and publishing the encrypted private randomness (Step 340). In some implementations, process 300 may comprise one or more additional steps, while some of the steps listed above may be modified or excluded. In some implementations, one or more steps illustrated in FIG. 3 may be executed in a different order and/or one or more groups of steps may be executed simultaneously and vice versa. For example, Step 330 may be executed before, after and/or simultaneously with Step 340, and so forth. Examples of possible execution manners of process 300 may include: continuous execution, returning to the beginning of the process once the process normal execution ends; periodically execution, executing the process at selected times; execution upon the detection of a trigger, where examples of such trigger may include a trigger from a user, a trigger from another process, etc.; any combination of the above; and so forth.

Figure 5:
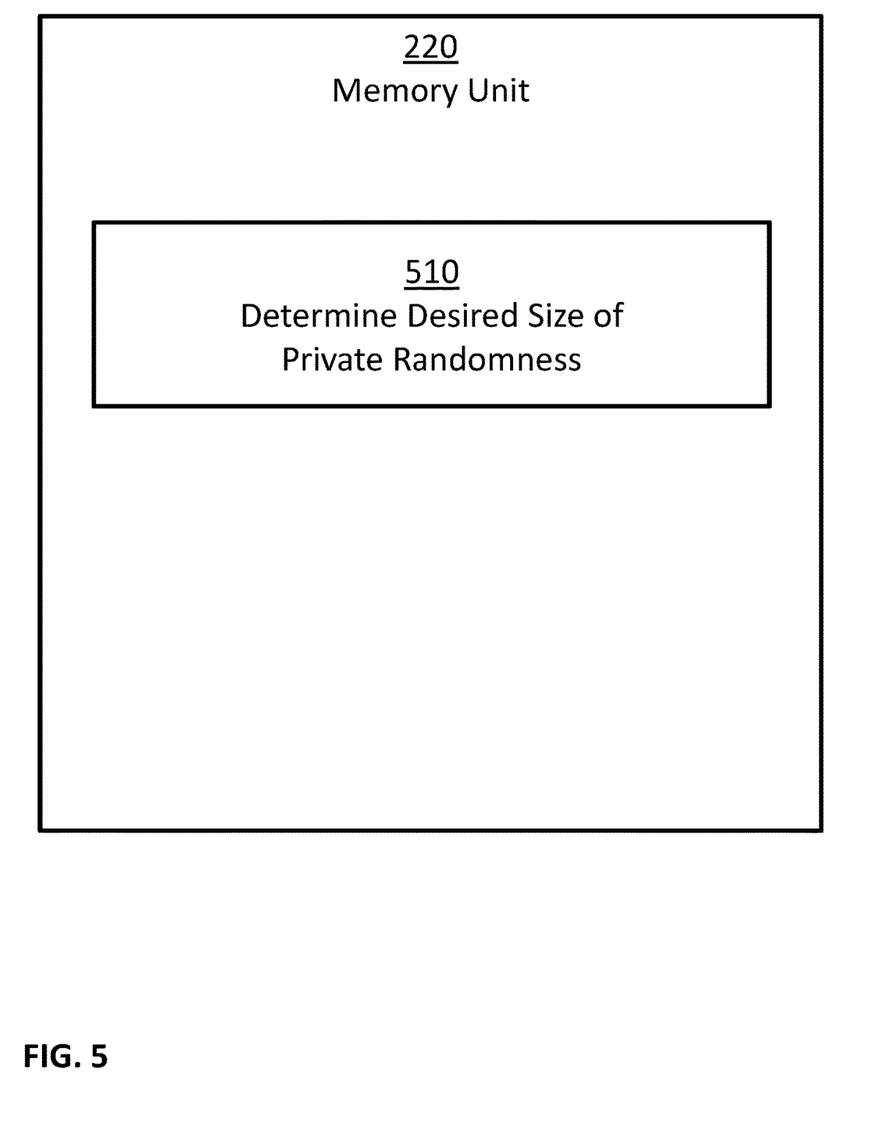
FIG. 5 illustrates an exemplary embodiment of a memory containing a software module.

In some embodiments, generating private randomness (Step 310) may comprise generating one or more random values (such as bits, numbers, etc.). In some examples, generating private randomness (Step 310) may comprise using at least one of the followings to generate the private randomness: random number generator, pseudorandom number generator, cryptographically secure pseudorandom number generator, true random number generator (a.k.a. hardware random number generator), and so forth. In some embodiments, the size of the private randomness (for example, the number of bits, numbers, and/or values in the private randomness the entropy of the private randomness, etc.) may be predetermined, selected, calculated, and so forth. For example, a desired size of the private randomness may be determined using Module 510 (described below), and Step 310 may generate a private randomness so that the size of the generated private randomness is at least the determined desired size. For example, a random number generator may be activated repeatedly and the resulting random values may be aggregated until the size of the aggregated random values is sufficient.

In some embodiments, encrypting the private randomness (Step 320) may comprise encrypting the private randomness generated using Step 310. In some examples, encrypting the private randomness (Step 320) may comprise encrypting the private randomness using a cryptographic encryption algorithm, a cryptographic hash function, an irreversible encoder, and so forth. In some examples, encrypting the private randomness (Step 320) may comprise encoding a private randomness $\tau$ of a ring F as xyP, where x is a vector of powers of $\tau$, y is a random element of ring F, and P is an elliptic curve group generators, for example as described below.

In some embodiments, deleting the private randomness (Step 330) may comprise deleting the private randomness generated using Step 310. In some examples, deleting the private randomness (Step 330) may comprise deleting the private randomness so that the private randomness is unrecoverable. In some examples, deleting the private randomness (Step 330) may comprise deleting all copies of the private randomness. In some examples, deleting a copy of the private randomness from memory may comprise writing a value over the copy of the private randomness in the memory. In some examples, deleting a copy of the private randomness from memory may comprise repeatedly writing different values over the place in memory where the private randomness was stored. For examples, this may involve one repetition, two repetitions, three repetitions, four repetitions, five or more repetitions, ten or more repetitions, one hundred repetitions or more, one thousand repetitions or more, and so forth.

Figure 4:
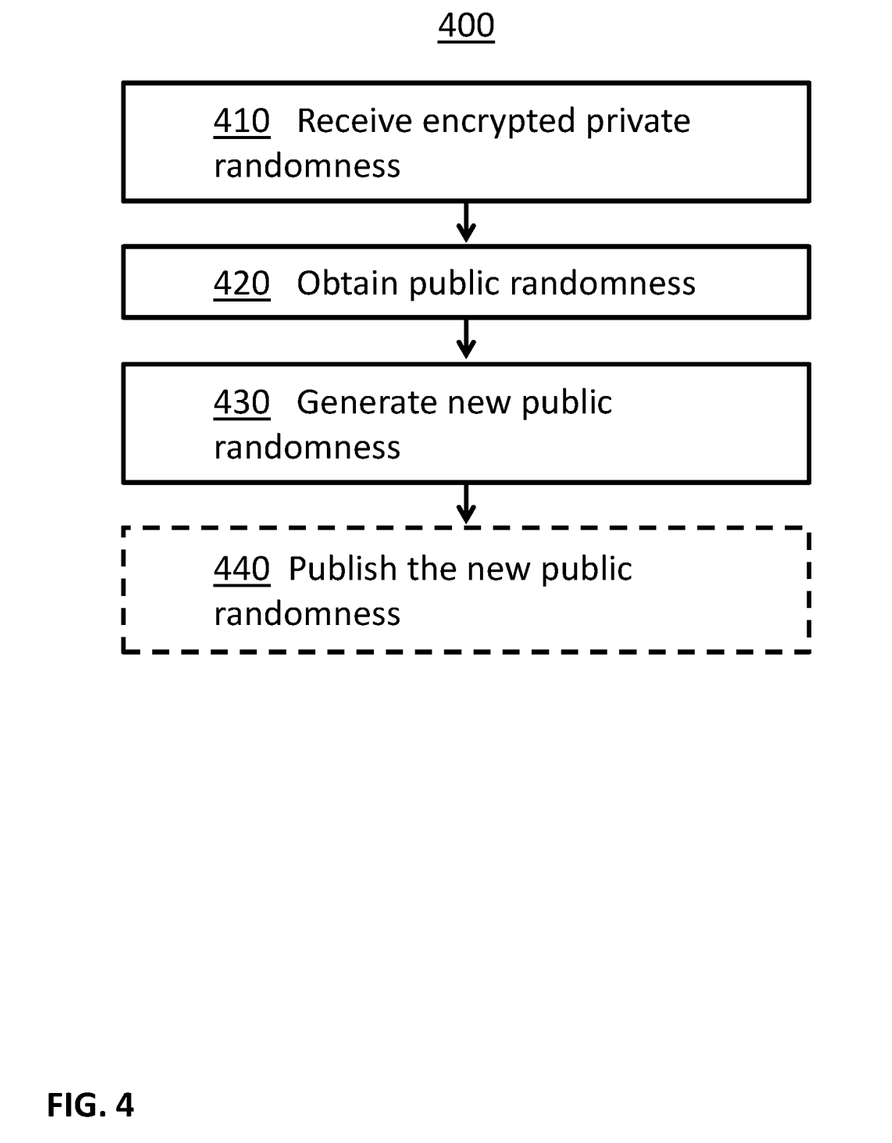
FIG. 4 illustrates an example of a process for generating randomness.

In some embodiments, publishing the encrypted private randomness (Step 340) may comprise publishing the encrypted private randomness produced by Step 320. In some examples, publishing the encrypted private randomness (Step 340) may comprise providing the encrypted private randomness to process 400 (described below) and/or to Step 410 (described below) and/or to Step 430 (described below). In some examples, publishing the encrypted private randomness (Step 340) may comprise writing the encrypted private randomness to memory, for example to memory units 220. In some examples, publishing the encrypted private randomness (Step 340) may comprise communicating the encrypted private randomness to at least one external entity. In some examples, publishing the encrypted private randomness (Step 340) may comprise transmitting the encrypted private randomness to an external entity, for example using communication modules 240. In some examples, publishing the encrypted private randomness (Step 340) may comprise storing the encrypted private randomness in a public repository, such as a public file system, a web server, a blockchain, and so forth.

In some embodiments, publishing the encrypted private randomness (Step 340) may comprise committing the encrypted private randomness produced by Step 320. In some examples, a commitment scheme may be used to commit the encrypted private randomness. For example, a hash based commitment scheme (such as BLAKE-2, SHA-256) may be used to commit the encrypted private randomness. For example, algebraic commitment scheme (such as Pedersen commitment scheme) may be used to commit the encrypted private randomness. In some examples, the encrypted private randomness may be committed by adding a commitment record of the encrypted private randomness to a blockchain. In some examples, the encrypted private randomness may be committed by providing the encrypted private randomness and/or a commitment record of the encrypted private randomness to a trusted third party.

In some embodiments, an external device may be configured to calculate a public randomness based, at least in part, on the published encrypted private randomness, for example using Step 430 (described below) and/or process 400 (described below), for example after the deletion of the private randomness using Step 330. In some embodiments, process 300 may further obtain a public randomness, for example using Step 420 (described below), and generate a new public randomness based, at least in part, on the published encrypted private randomness, for example using Step 430 (described below) and/or process 400 (described below), for example after the deletion of the private randomness using Step 330. In some examples, process 300 may further continue to publish the new public randomness, for example using Step 440 (described below).

FIG. 4 illustrates an example of process 400 for generating randomness. In some examples, process 400, as well as all individual steps therein, may be performed by various aspects of: processing unit 230, computerized system 200, and so forth. For example, process 400 may be performed by processing units 230, executing software instructions stored within memory units 220. In some examples, process 400, as well as all individual steps therein, may be performed using a multiparty computation (a.k.a. secure multiparty computation), executed by a plurality of entities. Process 400 may comprise: receiving encrypted private randomness (Step 410), obtaining public randomness (Step 420), and generating new public randomness (Step 430). In some implementations, process 400 may comprise one or more additional steps, while some of the steps listed above may be modified or excluded. For example, Step 410 and/or Step 420 may be excluded from process 400. For example, process 400 may further comprise publishing the new public randomness (Step 440). In some implementations, one or more steps illustrated in FIG. 4 may be executed in a different order and/or one or more groups of steps may be executed simultaneously and vice versa. For example, Step 410 may be executed before, after and/or simultaneously with Step 420, and so forth. Examples of possible execution manners of process 400 may include: continuous execution, returning to the beginning of the process once the process normal execution ends; periodically execution, executing the process at selected times; execution upon the detection of a trigger, where examples of such trigger may include a trigger from a user, a trigger from another process, etc.; any combination of the above; and so forth.

In some embodiments, receiving encrypted private randomness (Step 410) may comprise receiving encrypted private randomness from one or more sources. In some examples, receiving encrypted private randomness (Step 410) may comprise obtaining encrypted private randomness produced by one or more instances process 300, obtaining encrypted private randomness produced by one or more executions of Step 320, obtaining encrypted private randomness published by one or more instances of process 300, obtaining encrypted private randomness published by one or more executions of Step 340, and so forth. In some examples, receiving encrypted private randomness (Step 410) may comprise reading the encrypted private randomness from memory, for example from memory units 220. In some examples, receiving encrypted private randomness (Step 410) may comprise communicating with at least one external entity to obtain the encrypted private randomness. In some examples, receiving encrypted private randomness (Step 410) may comprise receiving the encrypted private randomness from one or more external entities, for example using communication modules 240. In some examples, receiving encrypted private randomness (Step 410) may comprise accessing encrypted private randomness in a public repository, reading encrypted private randomness from a public file system, accessing encrypted private randomness on a web server, accessing encrypted private randomness encoded in a blockchain, and so forth.

In some embodiments, obtaining public randomness (Step 420) may comprise receiving public randomness from one or more sources. In some examples, obtaining public randomness (Step 420) may comprise obtaining public randomness generated by previous execution of process 400, by previous execution of Step 430, and so forth. In some examples, obtaining public randomness (Step 420) may comprise reading public randomness from memory, for example from memory units 220. In some examples, obtaining public randomness (Step 420) may comprise communicating with at least one external entity to obtain the public randomness. In some examples, obtaining public randomness (Step 420) may comprise receiving the public randomness from one or more external entities, for example using communication modules 240. In some examples, obtaining public randomness (Step 420) may comprise accessing public randomness in a public repository, reading public randomness from a public file system, accessing public randomness on a web server, accessing public randomness encoded in a blockchain, and so forth.

In some embodiments, generating new public randomness (Step 430) may comprise generating new public randomness based, at least in part, on previous public randomness and/or on encrypted private randomness. In some examples, generating new public randomness (Step 430) may comprise generating new public randomness based, at least in part, on encrypted private randomness, for example, based, at least in part, on encrypted private randomness obtained using Step 410, on encrypted private randomness generated using process 300, on encrypted private randomness generated using Step 320, and so forth. In some examples, generating new public randomness (Step 430) may comprise generating new public randomness based, at least in part, on previous public randomness obtained using Step 420, on previous public randomness generated by previous execution of Step 430, and so forth. Some specific examples of methods for the generation of public randomness based on previous public randomness and/or on encrypted private randomness are detailed below.

In some embodiments, publishing the new public randomness (Step 440) may comprise publishing public randomness, for example publishing public randomness generated by Step 430 and/or by process 400. In some examples, publishing the new public randomness (Step 440) may comprise providing the public randomness to future instances of process 400 and/or to future instances of Step 420 and/or to future instances of Step 430. In some examples, publishing the new public randomness (Step 440) may comprise writing the public randomness to memory, for example to memory units 220. In some examples, publishing the new public randomness (Step 440) may comprise communicating the public randomness to at least one external entity. In some examples, publishing the new public randomness (Step 440) may comprise transmitting the public randomness to an external entity, for example using communication modules 240. In some examples, publishing the new public randomness (Step 440) may comprise storing the public randomness in a public repository, such as a public file system, a web server, a blockchain, and so forth.

The Tsallis entropy of n non-negative values that sum to one, denoted $p_1, \ldots, p_n$, is defined as, $S_q(p_1, \ldots, p_n) = (q-1)^{-1}(1-p_1^q - \ldots -p_n^q)$. The parameter q of the Tsallis entropy is called entropic index. In some embodiments, the Tsallis entropy of values in a stream of values may be calculated, for example using one or more entropic indexes. Any valid entropic index may be used, such as: 0.1, 0.2, 0.3, 0.4, 0.5, 0.6, 0.7, 0.8, 0.9, and so forth.

FIG. 5 illustrates an exemplary embodiment of a memory containing a software module. Included in memory unit 220 is module 510 for determining desired size of private randomness. Module 510 may contain software instructions for execution by at least one processing device, such as processing unit 230, by computerized system 200, and so forth. Module 510 may cooperate with steps of process 300 and/or process 400.

In some embodiments, module 510 for determining desired size of private randomness may comprise determining desired size of private randomness based, at least in part, on a measurement of a public randomness. In some examples, the measurement of the public randomness may be obtained, for example by accessing the public randomness and measuring the public randomness, by accessing records associated with the public randomness, by receiving the measurement of the public randomness from an external source, by reading the measurement of the public randomness from memory, and so forth. For example, the measurement of the public randomness may be the length of the public randomness (for example measured in bits, in bytes, and so forth). For example, the measurement of the public randomness may be the entropy of the public randomness. For example, the measurement of the public randomness may be a Tsallis entropy of the public randomness, a Tsallis entropy of the public randomness with entrophic index smaller than ¼ (one quarter), a Tsallis entropy of the public randomness with entrophic index smaller than ½ (one half), a Tsallis entropy of the public randomness with entrophic index larger than ½ (one half), a Tsallis entropy of the public randomness with entrophic index larger than ¾ (three quarters), and so forth. For example, the measurement of the public randomness may be a function of a plurality of Tsallis entropy values of the public randomness, each of the plurality of Tsallis entropy values may be calculated with a different entrophic index. For example, the measurement of the public randomness may be defined as a function of the number of contributors to the public randomness, the size of contribution of one or more contributors to the public randomness, the length of the public randomness, the entropy of the public randomness, one or more Tsallis entropy values of the public randomness, and so forth.

In some embodiments, module 510 for determining desired size of private randomness may comprise determining desired size of private randomness based, at least in part, on a measurement of a plaintext. In some examples, the measurement of the plaintext may be obtained, for example by accessing the plaintext and measuring the plaintext, by receiving the measurement of the plaintext from an external source, by reading the measurement of the plaintext from memory, and so forth. For example, the measurement of the plaintext may be the length of the plaintext (for example measured in bits, in bytes, and so forth). For example, the measurement of the plaintext may be the entropy of the plaintext. For example, the measurement of the plaintext may be a Tsallis entropy of the plaintext, a Tsallis entropy of the plaintext with entrophic index smaller than ¼ (one quarter), a Tsallis entropy of the plaintext with entrophic index smaller than ½ (one half), a Tsallis entropy of the plaintext with entrophic index larger than ½ (one half), a Tsallis entropy of the plaintext with entrophic index larger than ¾ (three quarters), and so forth. For example, the measurement of the plaintext may be a function of a plurality of Tsallis entropy values of the plaintext, each of the plurality of Tsallis entropy values may be calculated with a different entrophic index.

In some embodiments, module 510 for determining desired size of private randomness may comprise accessing a table and/or a graph according to the measurement of the public randomness and/or the measurement of the plaintext to determine the desired size of private randomness. In some examples, module 510 for determining desired size of private randomness may comprise evaluating a function using the measurement of the public randomness and/or the measurement of the plaintext as parameters to determine the desired size of private randomness. In some examples, module 510 for determining desired size of private randomness may comprise executing a computer function using the measurement of the public randomness and/or the measurement of the plaintext as parameters to determine the desired size of private randomness.

In some examples, process 300 and module 510 may be performed by the same entity. For example, entity 121 may execute module 510 to determine the desired size of private randomness, and continue to execute process 300 to produce the private randomness and/or an encrypted private randomness. In some examples, process 300 and module 510 may be performed by different entities. For example, entity 121 may execute module 510 to determine the desired size of private randomness, provide the determined desired size of private randomness to entity 122, and entity 122 may execute process 300 to produce the private randomness and/or an encrypted private randomness.

In some examples, process 300 and process 400 may be performed by the same entity. For example, entity 121 may execute process 300 to produce an encrypted private randomness. Furthermore, entity 121 may execute process 400 to produce a new public randomness using a previous public randomness and the encrypted private randomness produced by process 300. Afterwards, entity 121 may publish the new public randomness, for example using Step 440, which may provide the new public randomness to entity 122, entity 123, entity 124, and/or entity 125.

In some examples, process 300 and process 400 may be performed by different entities. For example, entity 121 may execute process 300 to produce an encrypted private randomness. Entity 122 may execute process 400 to produce a new public randomness using a previous public randomness and the encrypted private randomness produced by entity 121 using process 300. Afterwards, entity 122 may publish the new public randomness, for example using Step 440, which may provide the new public randomness back to entity 121 and/or provide the new public randomness to entity 123, entity 124, and/or entity 125.

In some examples, process 400 may be performed using a multiparty computation (a.k.a. secure multiparty computation), executed by a plurality of entities. In some examples, the plurality of entities may include an entity performing process 300, while in other examples the plurality of entities may not include an entity performing process 300.

Following, some more possible implementation details are provided. These implementation details are exemplary and explanatory only and are not restrictive.

In some embodiments, randomness may be generated and encoded into some elliptic curve group generators. In some examples, randomness from different sources may be combined, for example using a multiparty computation. Furthermore, the randomness may be destroyed.

In some embodiments, a multiparty computation based protocol may output a public randomness, for example in the form of a collection of encoded randomness with a structure, xyP, where $x \in F_r^{d+1}$ is a d+1 dimensional vector of powers of a random element, $\tau \in F_r$, $y \in F_r$ is a random element, and P∈$G_1$ is an elliptic curve group generators. The i-th player may generates private randomness, random which is shared in the form of an encoding, encode$_i$, for example after committing to it, $h_i$=COMM (encode$_i$). In some examples, non-interactive zero-knowledge proof may be used to ensure that a player knows the private randomness and/or the random exponents the player committed. In some examples, the protocol may comprise a two-party computation, a first party that may extend a public randomness and/or collection of encoded randomness using a private randomness, and a second party that may provide the collection of encoded randomness and/or may verify that the first party executed the algorithm correctly. In some examples, when no previous public randomness and/or collection of encoded randomness is available, an initial public randomness and/or collection of encoded randomness may be selected randomly, produced based on a private randomness, set to a selected constant value, and so forth.

In some embodiments, the system may verify that the exponents of an elliptic curve group elements are the same in each step of a multiparty computation and in each group. In some examples, the system may verify that all the steps were done appropriately by the parties. For example, the system may verify that all players used the same random exponents with each instance of the exponent. For example, using a pairing friendly elliptic curve, E and its twist curve, Ẽ, specified by a prime r and over a base field $F_r$; defining three cyclic groups of order r, $G_1$, $G_2$ and $G_T$, and the bilinear pairing f:$G_1 \times G_2 \to G_T$, such that $G_1$ is a subgroup of order r of the group derived from E, $G_2$ is a subgroup of order r of the group derived from the twist curve, Ẽ and $G_T$ is the subgroup of r-th roots of unity in some extension field of $F_r$; fixing two generators, $P_1 \in G_1$ and $P_2 \in G_2$ the system may verify that two encodings, m∈$G_1^2$ and w∈$G_2^2$ use the same random exponent by verifying that f($m_1,w_2$)=f($m_2,w_1$). This verification process may be extended to σ-vectors, where V is a σ-vector if for some g∈G, V is of the form V=(g, σg, $\sigma^2 g$, ..., $\sigma^d g$) for some d∈N. We can rewrite the V to denote the σ-multiples, V'=((g,σg), (σg,$\sigma^2 g$), ..., ($\sigma^{d-1}g, \sigma^d g$)).

In some embodiments, given an upper bound on the number of constraints, a sufficient public randomness and/or collection of encoded randomness may be generated. For example, given a maximum number of multiplication gates in the circuit, and given two elliptic curve group generators, $P_1 \in G_1$ and $P_2 \in G_2$, the system may generate some random elements random={$\tau, \rho_A, \rho_B, \alpha_A, \alpha_B, \alpha_C, \beta, \gamma$} which are combined using exponents, for example using $\exp_{P_1}$={$\rho_A, \alpha_B, \alpha_A\rho_A$, $\alpha_B\rho_B, \rho_A\rho_B, \alpha_C\rho_A\rho_B, \beta\rho_A, \beta\rho_B, \beta\rho_A\rho_B, \gamma\beta$} and $\exp_{P_2}$={$\rho_B$, $\alpha_C, \gamma, \alpha_A, \rho_A\rho_B, \gamma\beta$}, outputting a public randomness and/or collection of encoded randomness ($\Xi_1, \Xi_2$)∈$G_1^{(d+1) \times 9+2} \times G_2^{(d+1) \times 2+4}$ yielding the following elements for $\Xi_1$:

$$\Xi_1 = (1, \tau, \ldots, \tau^d)P_1 \in G_1^{d+1},$$

$$\Xi_{1,\rho_A} = (1, \tau, \ldots, \tau^d)\rho_A P_1 \in G_1^{d+1},$$

$$\Xi_{1,\alpha_A\rho_A} = (1, \tau, \ldots, \tau^d)\alpha_A\rho_A P_1 \in G_1^{d+1},$$

$$\Xi_{1,\alpha_B\rho_B} = (1, \tau, \ldots, \tau^d)\alpha_B\rho_B P_1 \in G_1^{d+1},$$

$$\Xi_{1,\rho_A\rho_B} = (1, \tau, \ldots, \tau^d)\rho_A\rho_B P_1 \in G_1^{d+1},$$

$$\Xi_{1,\alpha_C\rho_A\rho_B} = (1, \tau, \ldots, \tau^d)\alpha_C\rho_A\rho_B P_1 \in G_1^{d+1},$$

$$\Xi_{1,\beta\rho_A} = (1, \tau, \ldots, \tau^d)\beta\rho_A P_1 \in G_1^{d+1},$$

$$\Xi_{1,\beta\rho_B} = (1, \tau, \ldots, \tau^d)\beta\rho_B P_1 \in G_1^{d+1},$$

-continued $$\Xi_{1,\beta\rho_A\rho_B} = (1, \tau, \ldots, \tau^d)\beta\rho_A\rho_B P_1 \in G_1^{d+1},$$

$$\chi_{1,\alpha_B} = \alpha_B P_1 \in G_1, \chi_{1,\gamma\beta} = \gamma\beta P_1 \in G_1,$$

and the following elements for $\Xi_2$:

$$\Xi_{2,\rho_B} = (1, \tau, \ldots, \tau^d)\rho_B P_1 \in G_1^{d+1},$$

$$\Xi_{2,\rho_A\rho_B} = (1, \tau, \ldots, \tau^d)\rho_A\rho_B P_2 \in G_1^{d+1}, \chi_{2,\beta\gamma} = \gamma\beta P_2 \in G_2,$$

$$\chi_{2,\alpha_C} = \alpha_C P_2 \in G_2, \chi_{2,\alpha_B} = \alpha_A P_2 \in G_2, \chi_{2,\gamma} = \gamma P_2 \in G_2.$$

Note that for σ∈$\exp_{P_k}$, where k∈{1,2}, we write $\Xi_{k,\sigma}$=(1, τ, ..., $\tau^d$)σ$P_k$ and we write $\chi_{k,\sigma}$=σ$P_k$. The main difference being the vector of powers of τ.

In some embodiments, for an arithmetic circuit, C:$F_r^n \times F_r^h \leftarrow_r^l$, a set of polynomials with degree u and size m representing the gate structure of the circuit may be computed.

In some embodiments, quadratic arithmetic program polynomials may be generated from selected constraints, and fast Fourier transform may be performed on randomness and/or on an encoded randomness to generate proving keys and/or verification keys. For example, for some elliptic curve E, with generators, $P_1 \in G_1$, of the elliptic curve group and $P_2 \in G_2$ of the group derived from its twisted curve, Ẽ, for a set of polynomials with degree u and size m representing the gate structure of an arithmetic circuit, C:$F_r^n \times F_r^h \leftarrow F_r^l$, with degree d and size m, and for the random elements R:={$\tau, \alpha_A, \alpha_B, \alpha_C, \rho_A, \rho_B, \beta, \gamma$}∈$F_r$, the system may output a proving key pk, where for j=0, ..., m+3, $pk_{A,j}=A_j(\tau)\rho_A P_1$, $pk'_{A,j}=A_j(\tau)\alpha_A\rho_A P_1$, $pk_{B,j}=B_j(\tau)\rho_B P_2$, $pk'_{B,j}=B_j(\tau)\alpha_B\rho_B P_1$, $pk_{C,j}=C_j(\tau)\rho_A\rho_B P_1$, $pk'_{C,j}=C_j(\tau)\alpha_C\rho_A\rho_B P_1$, $pk_{K,j}=\beta(A_j(\tau)\rho_A+B_j(\tau)\rho_B+C_j(T)\rho_A\rho_B)P_1$, and for j=0, 1, ..., d, $pk_{H,j}=\tau^j P_1$, and a verification key vk, where $vk_A=\alpha_A P_2$, $vk_B=\alpha_B P_1$, $vk_C=\alpha_C P_2$, $vk_\gamma=\gamma P_2$, $vk_{\beta\gamma}^1=\gamma\beta P_1$, $vk_{\beta\gamma}^2=\gamma\beta P_2$ $vk_Z=Z(\tau)\rho_A\rho_B P_2$, $(vk_{IC,j})_{j=0}^n$=$(A_j(\tau)\rho_A P_1)_{j=0}^n$. In some examples, a fast fourier transform may be used to evaluate the quadratic arithmetic program polynomials at a random point, and to generate a proving key and a verification key. For example, for an element of the collection of encoded randomness and for a polynomial Y(x) the system may calculate (Y(x),$\Xi_{k,\sigma}$)=Y(τ)σ$P_k$. For example, given a size m of a quadratic arithmetic program polynomial, the system may calculate $$(\Xi_{1,\rho_A}) = \{pk_{A,j}\}_{j=0}^{m+3}.$$

In some embodiments, a coordinator may interact with one or more players, for example in FIG. 1 a coordinator 121 may interact with players 122, 123, 124, and 125. In some examples, the interaction may comprise three rounds, where at the end of each round the coordinator (and/or any other player) may verify the computations performed by the players before continuing onto the next computation. Given a fixed integer d, which represents the maximum number of multiplication gates in the circuit to be used in a quadratic arithmetic program, and given two elliptic curve group generators as defined above, $P_1 \in G_1$ and $P_2 \in G_2$ the first of the three rounds may comprise random shares steps, the second round may comprise checking and combining steps, and a third round may comprise computing the powers of the randomness.

In some examples, the first of the three rounds may comprise random shares steps. For example, in the first round a player may generate a private randomness, for example using random$_i$ $$:= \{\tau_i, \rho_{A,i}, \rho_{B,i}, \alpha_{A,i}, \alpha_{B,i}, \alpha_{C,i}, \beta_i, \gamma_i\} \xleftarrow{R} F_r^*;$$

may compute exps$_i$:=$\{\tau, \rho_A, \rho_B, \rho_A\rho_B, \alpha_A, \alpha_B, \alpha_C, \alpha_A\rho_A, \alpha_B\rho_B, \alpha_C\rho_A\rho_B, \beta, \gamma, \beta\gamma\}$, where we have removed the player index i from the elements for clarity and where we have exps$_i$=exps$_{P_1,i}\cup$exps$_{P_2,i}$, without repeated elements; may compute encode$_i$:=$(\tau, \rho_A, \rho_B, \rho_A\rho_B, \alpha_A, \alpha_B, \alpha_C, \alpha_A\rho_A, \alpha_B\rho_B, \alpha_C\rho_A\rho_B, \beta, \gamma, \beta\gamma)\cdot P$, which encodes the secret exponents, exps$_i$, in the exponent of the elliptic curve generators, where we write $P=(P_1,P_2)$; and may commit the to the encodings $h_i$=COMM (encode$_i$) and publish $h_i$.

In some examples, in the second round a player may publish encode$_i$, and the coordinator (and/or any other player) may verify the commitments made by the players, $h_i$, using the published encode$_i$, for example by checking that the same $\rho_A$ was used in $\rho_A P_1$ and $\rho_A P_2$, for example as described above, for example by computing a bilinear pairing, f:$G_1 \times G_2 \rightarrow G_T$, on the elliptic curve points of encode$_{P_1}$ and encode$_{P_2}$ that have a random element in the exponent in common. In some examples, for all $\sigma_i \in$exps$_i$, the coordinator may verify that $e_{o_i}$ is not zero. In case the verification fails, the coordinator may inform the player, inform other players, reject the player, and so forth. In some examples, in the second round a player may prove that the player knows the exponents of the encodings. For example, the player may compute a hash of the public outputs of the first round, h=COMM($h_1 \circ \ldots \circ h_n$), and publish it. Furthermore, for each $\sigma_i \in$random$_i$, the player may compute $h_{o_i}$=h$\circ e_{o_i}^1$, and may compute a proof $\pi_{o_i}$=NIZK($e_{o_i}^1, h_{o_i}$):=(R,u)=(a·$P_1$,a+c·$\sigma_i$), where a←$F_r^*$ and c:=COMM(R$\circ h_{o_i}$) may be interpreted as an element of $F_r$, for example by taking it's first log r bits. Furthermore, the player may publish ($\pi_{o_i}, e_{o_i}^1, h_{o_i}$). At this point, the coordinator (and/or any other player) may verify, for each player and $e_{o_i} \in$encode$_i$, ($\pi_{o_i}, e_{o_i}^1, h_{o_i}$), for example using a non-interactive zero-knowledge proof. For example, the coordinator (and/or any other player) may compute c:=COMM(R$\circ h_{o_i}$), and may accept the encoding if u·$P_1$=R+c·$\sigma_i P_1$ for all inputs. By having a different $h_{o_i}$ for each non-interactive zero-knowledge proof, a player may verify that a valid string was used with each proof (since they are publicly verifiable) and ensure that each is unique. Finally, a multiparty computation for multiparty multiplication may be performed by the players, as described below.

In some examples, a multiparty computation for multiparty multiplication may be performed to compute the multiplication of the player's private randomness in a distributed and private manner. Given the random shares $\sigma_1, \ldots, \sigma_N \in F_r$, corresponding to N players, the multiparty multiplication may compute the elliptic curve group element $\sigma Q \in G_k$, where $k \in \{1,2\}$, $\sigma = \Pi_{i=1}^N \sigma_i$ and $Q \in G_l$ is some element of the elliptic curve group. In some examples, a first player may compute $\xi_{o_1}=\sigma_1 \cdot Q$ and publish $\xi_{o_1}$; in numerical order $2 \leq i \leq N$ the i-th player may compute $\xi_{o_i}=\sigma_i \cdot \xi_{o_{i-1}}$ and publish it; and the last player may publish $\xi_{o_N}=\xi_o=\sigma Q$. Next, a coordinator (and/or any other player) may verify the exponents of $(Q, \xi_{o_1})$ and $e_{o_1}$ are the same; may, for i=2, ..., N, verify that the exponents of $(\xi_{o_{i-1}}, \xi_{o_i})$ and $e_{o_i}$ are the same; and may reject the published data if any of the above verifications fails. The above multiparty multiplication may be extended to vectors.

In some examples, in the third round the current public randomness and/or encoded randomness may be published, for example $\tilde{\Xi}_1$ and $\tilde{\Xi}_2$ may be published. In some examples, for every element in $\tilde{\Xi}_1$ and $\tilde{\Xi}_2$ the first player may, for I=0; 1; : : : ; d, compute $\tau_1^l \cdot \tau'^l \sigma P_k$, yielding $\Xi_{1,k,o}=(1, t_1 t', \ldots, \tau_1^d \tau'^d)\sigma\sigma' P_k$, and publish $\Xi_{1,k,o}$. In some examples, for every element in $\tilde{\Xi}_1$ and $\tilde{\Xi}_2$ players i=2, ..., N may compute $T_i^l \ldots t_i^l \cdot \tau'^l \sigma P_k$, yielding $\Xi_{i,k,o}=(1, \tau_i \ldots \tau_1 \tau', \ldots, \tau_i^d \ldots \tau_1 \tau'^d)\sigma\sigma' P_k$ and publish $\Xi_{i,k,o}$. In some examples, the last player may publish the final public randomness and/or collection of encoded randomness $\Xi_{k,o}=\Xi_{N,k,o}=(1, \tau\tau', \ldots, \tau^d \tau'^d)\sigma\sigma' P_k=(1, \hat{\tau}, \ldots, \hat{\tau}^d)\hat{\sigma} P_k$. In some examples, the coordinator (and/or any other player) may verify that the powers of $\tau$ were correctly computed, for example by verifying that no player created any inconsistencies in the above steps. For example, the coordinator (and/or any other player) may verify that every player used the correct previous encoded randomness and updated it using the same $\tau_i$ in both groups. In some examples, if any of the verification fails, the coordinator may inform the player, inform other players, reject the player, and so forth. In some examples, a player may prove that the player knows the exponents of the encodings. In some examples, one or more of the players may delete their private randomness, for example using Step 330.

In some embodiments, keys may be generated based on the final public randomness and/or collection of encoded randomness. In some examples, quadratic arithmetic program polynomial may be evaluated at a some points, for example at a new random point $\tau$, for example by performing a fast fourier transform on the collection of encoded randomness. The quadratic arithmetic program polynomial may be a representation of some constraints, for example of constraints specified by an arithmetic circuit. This evaluation of the quadratic arithmetic program polynomial may be performed by any entity, including the coordinator and/or players of previous steps. For example, keys may be generated by verifying that a new random point $\tau$ is not a zero of $Z(x):=X^u-1$, and evaluating the quadratic arithmetic program polynomial at $\tau$.

In some examples, given an arithmetic circuit C:$F^n \times F^h \rightarrow F^l$, with a wires and b gates, a quadratic arithmetic program polynomial with degree u and size m may be computed. In case the degree u is greater than the maximal degree assumed in the generation of the public randomness and/or collection of encoded randomness, for example when the maximum number of multiplication gates in the circuit to be used in a quadratic arithmetic program is greater than the maximal number of multiplication gates assumed, a feedback indicating that may be provided, a new process for generating a new public randomness and/or collection of encoded randomness based on an assumption of a larger number of multiplication gates may be launched, the current keys generation process may be abandoned, and so forth.

In some examples, given a new random point $\tau$ the system may verify that $\tau$ is not a zero of $Z(x):=X^u-1$, or in other words, that $Z(\tau)=\tau^u-1 \neq 0$. For example, by taking the $0^{th}$ and $u^{th}$ coordinate of $\Xi_1$ and substracting them, $\tau^u \cdot P_1 - P_1 = (\tau^u - 1)P_1$.

In some examples, given a quadratic arithmetic program polynomial and the public randomness and/or collection of encoded randomness, the quadratic arithmetic program polynomial may be evaluated at a Lagrange basis representation, for example by evaluating elements of the form $(1, \tau, \ldots, \tau^d)\sigma P$ for many random $\sigma \in F_r$. In some examples, this may be performed by a single entity, by a plurality of entities, and so forth. In some examples, the proving and verification keys may be generated by computing $KAP(Y(x), \Xi_{k,o}) = Y(\tau)\sigma P_k$ for a polynomial $Y(x)$ and an element of the public randomness and/or collection of encoded randomness. For example, for $j=0, \ldots, m+3$ the system may compute $$pk_{A,j} = KAP(A_j(x), \Xi_{1,\rho_A}) = A_j(\tau)\rho_A P_1 \text{ and}$$
$$pk'_{A,j} = KAP(A_j(x), \Xi_{1,\alpha_A\rho_A}) = A_j(\tau)\alpha_A\rho_A P_1;$$
$$pk_{B,j} = KAP(B_j(x), \Xi_{2,\rho_B}) = A_j(\tau)\rho_B P_2 \text{ and}$$
$$pk'_{B,j} = KAP(B_j(x), \Xi_{1,\alpha_B\rho_B}) = B_j(\tau)\alpha_B\rho_B P_1;$$
$$pk_{C,j} = KAP(C_j(x), \Xi_{1,\rho_A\rho_B}) = C_j(\tau)\rho_A\rho_B P_1 \text{ and}$$
$$pk'_{C,j} = KAP(C_j(x), \Xi_{1,\alpha_C\rho_A\rho_B}) = C_j(\tau)\alpha_C\rho_A\rho_B P_1;$$
$$pk_{K,j} = KAP(A_j(x), \Xi_{1,\beta\rho_A}) + KAP(B_j(x),$$
$$\Xi_{1,\beta\rho_B}) + KAP(C_j(x), \Xi_{1,\beta\rho_A\rho_B}),$$

which yields $pk_{K,j} = \beta(A_j(\tau)\rho_A + B_j(\tau)\rho_B + C_j(\tau)\rho_A\rho_B)P_1$. Furthermore, the system may compute $vk_Z = KAP(Z(x), \Xi_{2,\rho_A\rho_B}) = Z(x)\rho_A\rho_B P_2$, and derive $vk_{IC,j} = A_j(\tau)\rho_A P_1$ from $pk_{A,j}$ for $j=0, \ldots, n$. The system may also use, $vk_A = \chi_{2,\alpha_A} = \alpha_A P_2$, $vk_B = \chi_{1,\alpha_B} = \alpha_B P_1$, $vk_C = \chi_{2,\alpha_C} = \alpha_C P_2$ and $vk_\gamma = \chi_{2,\gamma} = \gamma P_2$, $vk_{\beta\gamma}^1 = \chi_{1,\gamma\beta} = \gamma\beta P_1$, $vk_{\beta\gamma}^2 = \chi_{2,\beta\gamma} = \gamma\beta P_2$.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A system for generating randomness, the system comprising:
    at least one communication device; and
    at least one processing unit configured to:
        access a public randomness generated by one or more external entities using the at least one communication device, the public randomness is accessible by at least one additional external entity;
        calculate a measurement based on the public randomness;
        based on the measurement, determine a desired size of a private randomness;
        generate the private randomness, wherein the private randomness comprises one or more random values and the size of the generated private randomness is at least the determined desired size;
        obtain a vector comprising powers of a value of a mathematical ring;
        obtain a random element of the mathematical ring; and
        encrypt the private randomness using the vector, the random element, and an elliptic curve group generator,
        wherein the encrypted private randomness is configured to enable a creation of an updated public randomness using the public randomness and the encrypted private randomness.

2. The system of claim 1, wherein the at least one processing unit is further configured to:
    generate the updated public randomness based on the public randomness and the private randomness; and
    publish the updated public randomness.

3. The system of claim 1, wherein the at least one processing unit is further configured to:
    delete the private randomness so that the private randomness is unrecoverable; and
    publish the encrypted private randomness, wherein the published encrypted private randomness is configured to enable a calculation of the updated public randomness based on the private randomness after the deletion of the private randomness.

4. The system of claim 1, wherein the at least one processing unit is further configured to:
    obtain a measurement of a plaintext; and
    further base the determination of the desired size on the measurement of the plaintext.

5. The system of claim 1, wherein the measurement is based on a length of the public randomness.

6. The system of claim 1, wherein the measurement is based on a number of contributors to the public randomness.

7. The system of claim 1, wherein the measurement is based on a measurement of a contribution of a contributor to the public randomness.

8. The system of claim 1, wherein the calculated measurement is based on a function of a Tsallis entropy of the public randomness with an entropic index smaller than $\frac{1}{4}$.

9. A method for generating randomness, the method comprising:
    accessing a public randomness generated by one or more external entities using at least one communication device, the public randomness is accessible by at least one additional external entity;
    calculating a measurement based on the public randomness;
    based on the measurement, determining a desired size of a private randomness;
    generating the private randomness, wherein the private randomness comprises one or more random values and the size of the generated private randomness is at least the determined desired size;
    obtaining a vector comprising powers of a value of a mathematical ring;
    obtaining a random element of the mathematical ring; and
    encrypting the private randomness using the vector, the random element, and an elliptic curve group generator,
    wherein the encrypted private randomness is configured to enable a creation of an updated public randomness using the public randomness and the encrypted private randomness.

10. The method of claim 9, further comprising:
    generating the updated public randomness based on the public randomness and the private randomness; and
    publishing the updated public randomness.

11. The method of claim 9, further comprising:
    deleting the private randomness so that the private randomness is unrecoverable; and
    publishing the encrypted private randomness, wherein the published encrypted private randomness is configured to enable a calculation of the updated public randomness based on the private randomness after the deletion of the private randomness.

12. The method of claim 9, further comprising:
    obtaining a measurement of a plaintext; and
    further basing the determination of the desired size on the measurement of the plaintext.

13. The method of claim 9, wherein the measurement is based on a length of the public randomness.

14. The method of claim 9, wherein the measurement is based on a number of contributors to the public randomness.

15. The method of claim 9, wherein the measurement is based on a measurement of a contribution of a contributor to the public randomness.

16. The method of claim 9, wherein the calculated measurement is based on a function of a Tsallis entropy of the public randomness with an entrophic index smaller than $1/4$.

17. The method of claim 9, wherein x is the vector, y is the obtained random element, P is the elliptic curve group generator, and the encrypted private randomness is xyP.

18. A non-transitory computer readable medium storing data and computer implementable instructions for carrying out a method for generating randomness, the method comprising:
   accessing a public randomness generated by one or more external entities using at least one communication device, the public randomness is accessible by at least one additional external entity;
   calculating a measurement based on the public randomness;
   based on the measurement, determining a desired size of a private randomness;
   generating the private randomness, wherein the private randomness comprises one or more random values and the size of the generated private randomness is at least the determined desired size;
   obtaining a vector comprising powers of a value of a mathematical ring;
   obtaining a random element of the mathematical ring; and
   encrypting the private randomness using the vector, the random element, and an elliptic curve group generator,
   wherein the encrypted private randomness is configured to enable a creation of an updated public randomness using the public randomness and the encrypted private randomness.

* * * * *